(12) United States Patent
Yu et al.

(10) Patent No.: US 10,954,958 B2
(45) Date of Patent: Mar. 23, 2021

(54) HEAT DISSIPATION FAN

(71) Applicant: BEIJING DEEPCOOL INDUSTRIES CO., LTD., Beijing (CN)

(72) Inventors: Haibo Yu, Beijing (CN); Edsion Liu, Beijing (CN)

(73) Assignee: BEIJING DEEPCOOL INDUSTRIES CO., LTD., Beijing (CN)

( * ) Notice: Subject to any disclaimer, the term of this patent is extended or adjusted under 35 U.S.C. 154(b) by 0 days.

(21) Appl. No.: 15/578,480

(22) PCT Filed: Jun. 11, 2015

(86) PCT No.: PCT/CN2015/081271
§ 371 (c)(1),
(2) Date: Nov. 30, 2017

(87) PCT Pub. No.: WO2016/197377
PCT Pub. Date: Dec. 15, 2016

(65) Prior Publication Data
US 2018/0149168 A1 May 31, 2018

(51) Int. Cl.
*F04D 29/38* (2006.01)
*G06F 1/20* (2006.01)
(Continued)

(52) U.S. Cl.
CPC ....... *F04D 29/384* (2013.01); *F04D 25/0613* (2013.01); *F04D 29/325* (2013.01);
(Continued)

(58) Field of Classification Search
CPC .. F04D 29/384; F04D 25/0613; F04D 29/325; F04D 29/388; F04D 29/667
(Continued)

(56) References Cited

U.S. PATENT DOCUMENTS

2004/0062654 A1* 4/2004 Chang ................ F04D 29/38
416/223 R
2016/0138601 A1* 5/2016 Gallina ............... F04D 29/388
416/223 R

FOREIGN PATENT DOCUMENTS

CN 103032371 A 4/2013
CN 204041544 U 12/2014
(Continued)

OTHER PUBLICATIONS

CN204041544—English Machine Translation Office : China Application No. 201420484541.1 Application Date: Aug. 26, 2014 Publication No. 204041544 Publication Date: Dec. 24, 2014 (Year: 2014).*
(Continued)

*Primary Examiner* — Igor Kershteyn
*Assistant Examiner* — Elton K Wong
(74) *Attorney, Agent, or Firm* — Birch, Stewart, Kolasch & Birch, LLP

(57) ABSTRACT

The present invention relates to a heat dissipation fan, where the heat dissipation fan includes a fan frame and a fan blade, where the fan blade includes a hub and a plurality of double-layer blades evenly disposed around the hub, and a primary air intake area is formed between the double-layer blades; the double-layer blade includes a primary blade and a secondary blade, where the secondary blade is fixed on the primary blade, and a secondary air intake area is formed between the primary blade and the secondary blade; and when the heat dissipation fan works, an airflow enters the primary air intake area and the secondary air intake area of the heat dissipation fan through an air inlet of the heat dissipation fan, and forms a first airflow in the primary air intake area and a second airflow in the secondary air intake area, and the first airflow and the second airflow flow out through an air outlet of the heat dissipation fan. In the
(Continued)

present invention, the structure of the fan blade of the heat dissipation fan is improved, and the secondary blade is designed on the primary blade, and the secondary air intake area and the air guiding groove are further formed. In this way, air pressure and airflow aggregation are increased when the double-layer blades rotate, thereby reducing resistance on an air intake side, increasing wind pressure and reducing noise.

8 Claims, 3 Drawing Sheets

(51) Int. Cl.
  *F04D 29/68* (2006.01)
  *F04D 25/06* (2006.01)
  *F04D 29/32* (2006.01)
  *F04D 29/66* (2006.01)

(52) U.S. Cl.
  CPC ......... *F04D 29/388* (2013.01); *F04D 29/667* (2013.01); *F04D 29/681* (2013.01); *G06F 1/20* (2013.01)

(58) Field of Classification Search
  USPC ...................................................... 416/223 R
  See application file for complete search history.

(56) References Cited

FOREIGN PATENT DOCUMENTS

| | | | |
|---|---|---|---|
| CN | 303240660 S | 6/2015 | |
| JP | 07145798 A | * 6/1995 | ........... F04D 29/384 |
| TW | M494220 U | 1/2015 | |

OTHER PUBLICATIONS

International Search Report, issued in PCT/CN2015/081271, PCT/ISA/210, dated Sep. 9, 2015.

* cited by examiner

HEAT DISSIPATION FAN

BACKGROUND

Technical Field

The present invention relates to a heat dissipation fan, and in particular, to a heat dissipation fan in a personal computer.

Related Art

As the operating speed of electronic components constantly increases, waste heat generated in a computer also increases. If the heat is not dissipated in time, performance of the computer is lowered. A heat dissipation fan in an existing personal computer mainly includes: a fan blade, a fan frame, a shaft, a bearing, a motor, and a wire. The performance of the heat dissipation fan may be reflected by such parameters as rotational speed, noise, air volume, and wind pressure. By restructuring and designing the fan blade and the fan frame, air volume and wind pressure of the heat dissipation fan can be effectively increased and noise can be reduced. The fan blade of an existing heat dissipation fan usually includes a specific quantity of single-layer blades having curved cross-sections. Therefore, functions of the heat dissipation fan are limited.

The performance of the heat dissipation fan cannot be effectively improved only by designing curvatures of the blades.

SUMMARY

In view of the defects in the prior art, an objective of the present invention is to provide a heat dissipation fan, so as to effectively increase wind pressure and reduce noise of a heat dissipation fan.

To achieve the foregoing objective, the present invention provides a heat dissipation fan, where the heat dissipation fan includes a fan frame and a fan blade disposed in the fan frame, where the fan blade includes a hub and a plurality of double-layer blades evenly disposed around the hub, and a primary air intake area is formed between the double-layer blades;

the double-layer blade includes a primary blade and a secondary blade, where the secondary blade is fixed on the primary blade, and a secondary air intake area is formed between the primary blade and the secondary blade; and when the heat dissipation fan works, an airflow enters the primary air intake area and the secondary air intake area of the heat dissipation fan through an air inlet of the heat dissipation fan, and forms a first airflow in the primary air intake area and a second airflow in the secondary air intake area, and the first airflow and the second airflow flow out through an air outlet of the heat dissipation fan.

Preferably, the secondary blade is in parallel with the primary blade.

Preferably, a width of the secondary blade is less than a width of the primary blade.

Preferably, the secondary air intake area is cone-shaped, and a near-end cross-section of the secondary air intake area close to the hub is smaller than a far-end cross-section of the secondary air intake area distant from the hub.

Preferably, the cone is formed by changing a distance between the primary blade and the secondary blade.

Preferably, the cone is formed by changing a relationship between relative positions of the primary blade and the secondary blade.

Preferably, the secondary blade is fixed at a secondary-air-intake-area air outlet end on an air intake side surface of the primary blade by a plurality of connecting plates.

Preferably, the connecting plate includes a streamline structure that extends from the secondary-air-intake-area air outlet end to a secondary-air-intake-area air inlet end of the primary blade.

Preferably, an air guiding groove is formed between neighboring connecting plates on a same primary blade.

Preferably, connecting plates that are on different primary blades and that are equidistant to an axis of the hub are distributed on a same circumferential surface that is coaxial with an outer circumference of the hub.

An advantage of the present invention is that the heat dissipation fan uses a double-layer blade structure, so that a secondary air intake area is designed. This can effectively increase wind pressure and reduce noise.

DETAILED DESCRIPTION

Figure 1:
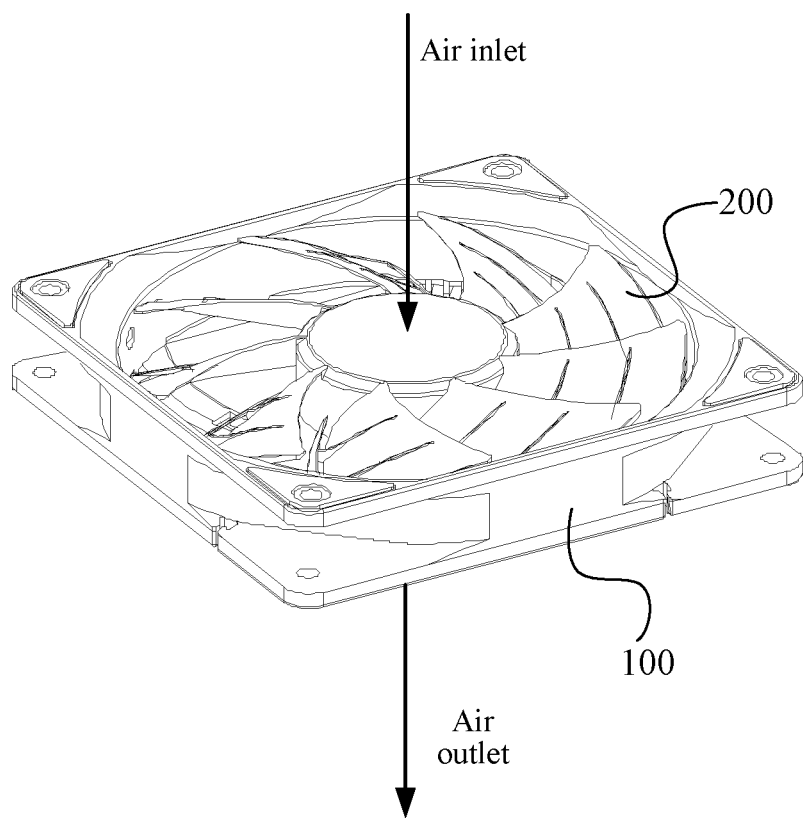
FIG. 1 is a schematic structural diagram of a heat dissipation fan according to the present invention.

The technical solutions of the present invention are further described in detail with reference to the accompanying drawings and embodiments as follows:

FIG. 1 is a schematic structural diagram of a heat dissipation fan according to the present invention. As shown in FIG. 1, the heat dissipation fan includes a fan frame 100 and a fan blade 200. The fan blade 200 is disposed in the fan frame 100.

Figure 2:
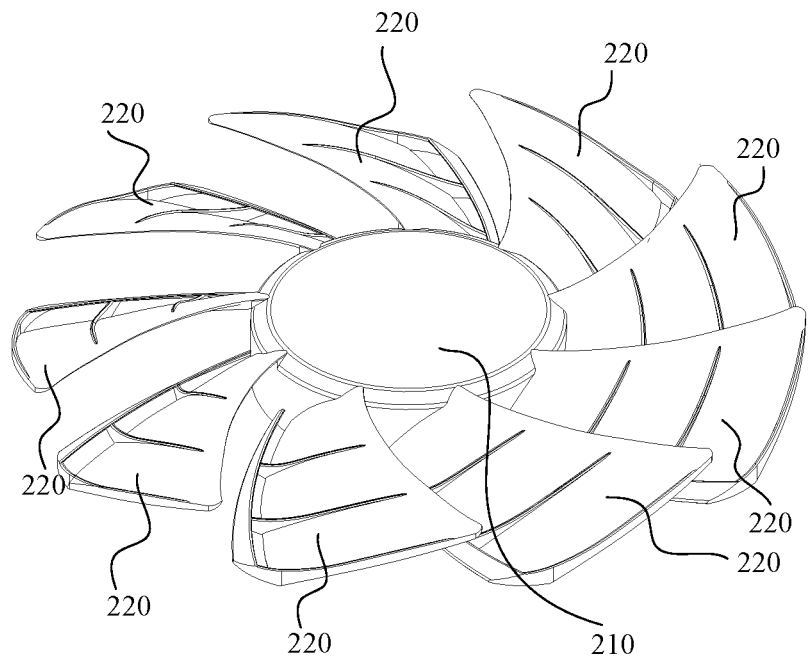
FIG. 2 is a schematic structural diagram of a fan blade of a heat dissipation fan according to the present invention.

FIG. 2 is a schematic structural diagram of a fan blade of a heat dissipation fan according to the present invention. As shown in FIG. 2, the fan blade includes a hub 210 and a plurality of double-layer blades 220. The plurality of double-layer blades 220 surround an outer circumferential surface of the hub 210 and are evenly fixedly arranged. A primary air intake area is formed between the double-layer blades 220. For example, in this embodiment, nine double-layer blades 220 are arranged at intervals on the outer circumferential surface of the hub 210. A side on which the double-layer blades 220 are located on the fan blade is an air intake side, and the other side is an air exhaust side.

Figure 3:
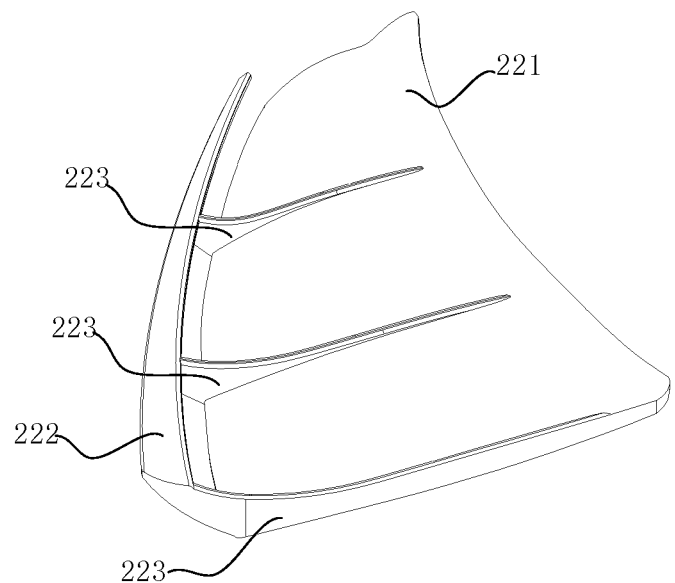
FIG. 3 is a first schematic structural diagram of a double-layer blade of a heat dissipation fan according to the present invention.

FIG. 3 is a first schematic structural diagram of a double-layer blade of a heat dissipation fan according to the present invention. As shown in FIG. 3, the double-layer blade 220 includes a primary blade 221 and a secondary blade 222. The secondary blade 222 is fixed on the primary blade 221, and a secondary air intake area is formed between the primary blade 221 and the secondary blade 222. During rotation of the double-layer blade 220, a design of the secondary air intake area increases air pressure, and airflow aggregation is increased by using gaps, thereby reducing resistance on an air intake side and increasing wind pressure on the air exhaust side.

When the heat dissipation fan works, an airflow enters a primary air intake area and the secondary air intake area of the heat dissipation fan through an air inlet of the heat dissipation fan, and forms a first airflow in the primary air intake area and a second airflow in the secondary air intake area. Finally, both the first airflow and the second airflow flow out through an air outlet of the heat dissipation fan.

Preferably, the primary blade 221 is substantially in parallel with the secondary blade 222. The primary blades 221 are fixed at intervals on an outer circumferential surface of a hub 210.

Preferably, the secondary blade 222 is fixed at a secondary-air-intake-area air outlet end on the air intake side surface of the primary blade 221 by a plurality of connecting plates 223. For example, in this embodiment, the secondary blade 222 is fixed on the air intake side surface of the primary blade 221 by using three connecting plates 223, thereby increasing wind pressure on the air exhaust side.

Preferably, the connecting plate 223 includes a streamline structure that extends from the secondary-air-intake-area air outlet end to a secondary-air-intake-area air inlet end of the primary blade 221, thereby reducing air intake resistance. Connecting plates 223 that are on different primary blades 221 and that are equidistant to an axis of the hub 210 are distributed on a same circumference that is coaxial with the outer circumference of the hub 210, thereby reducing air intake resistance. An air guiding groove is formed between neighboring connecting plates 223 on a same primary blade. When an airflow passes the air guiding groove, air pressure may be increased, thereby increasing airflow aggregation, reducing resistance on the air intake side and increasing wind pressure on the air exhaust side.

Preferably, a width of the secondary blade 222 is less than a width of the primary blade 221.

It should be noted that a root of the secondary blade 222 is fixed on the outer circumferential surface of the hub 210. In another specific embodiment, the root of the secondary blade 222 may be fixed on the primary blade 221. Alternatively, the entire secondary blade 222 is fixed on the air intake side surface of the primary blade 221, rather than that the root is fixed on the outer circumferential surface of the hub 210 or that a head is fixed on an end portion of the primary blade 221.

Figure 4:
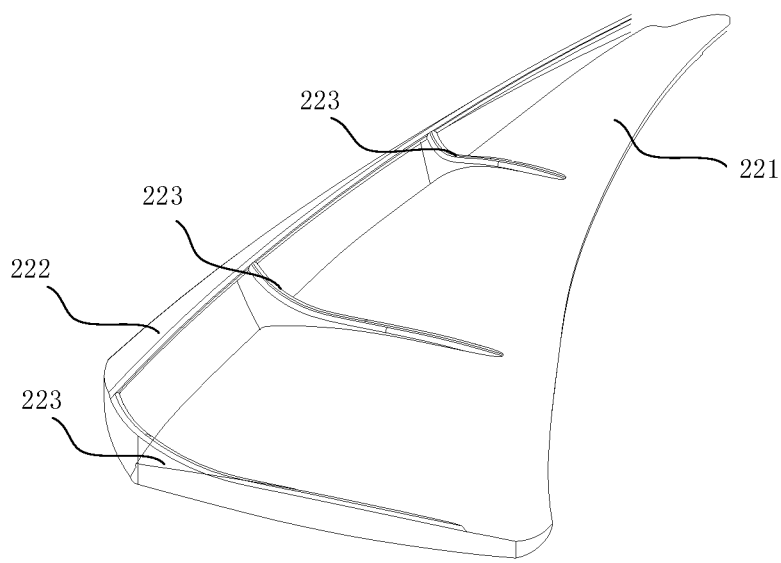
FIG. 4 is a second schematic structural diagram of a double-layer blade of a heat dissipation fan according to the present invention.

FIG. 4 is a second schematic structural diagram of a double-layer blade of a heat dissipation fan according to the present invention. As shown in FIG. 4, a secondary air intake area formed between a primary blade 221 and a secondary blade 222 is cone-shaped. A near-end cross-section of the secondary air intake area is smaller than a far-end cross-section of the secondary air intake area. The near-end cross-section of the secondary air intake area is specifically a cross-section of the secondary air intake area close to a hub 210, and the far-end cross-section of the secondary air intake area is specifically a cross-section of the secondary air intake area distant from the hub 210. The cone-shaped design of the secondary air intake area increases air pressure, thereby increasing airflow aggregation and wind pressure on the air exhaust side.

Preferably, the cone of the secondary air intake area may be formed by changing a distance between the primary blade 221 and the secondary blade 222. A distance between the primary blade 221 and the secondary blade 222 is small at a position close to the hub 210, and is large at a position distant from the hub 210. Thus, the cone of the secondary air intake area is formed.

Preferably, the cone of the secondary air intake area is formed by changing a relationship between relative positions of the primary blade 221 and the secondary blade 222. Because the blade has different curvatures at different positions, the sizes of the cross-sections of the blade at different positions also change as the relative positions change. The relative positions are changed so that a near-end cross-section is smaller than a far-end cross-section. Thus, the cone of the secondary air intake area is formed.

Figure 5:
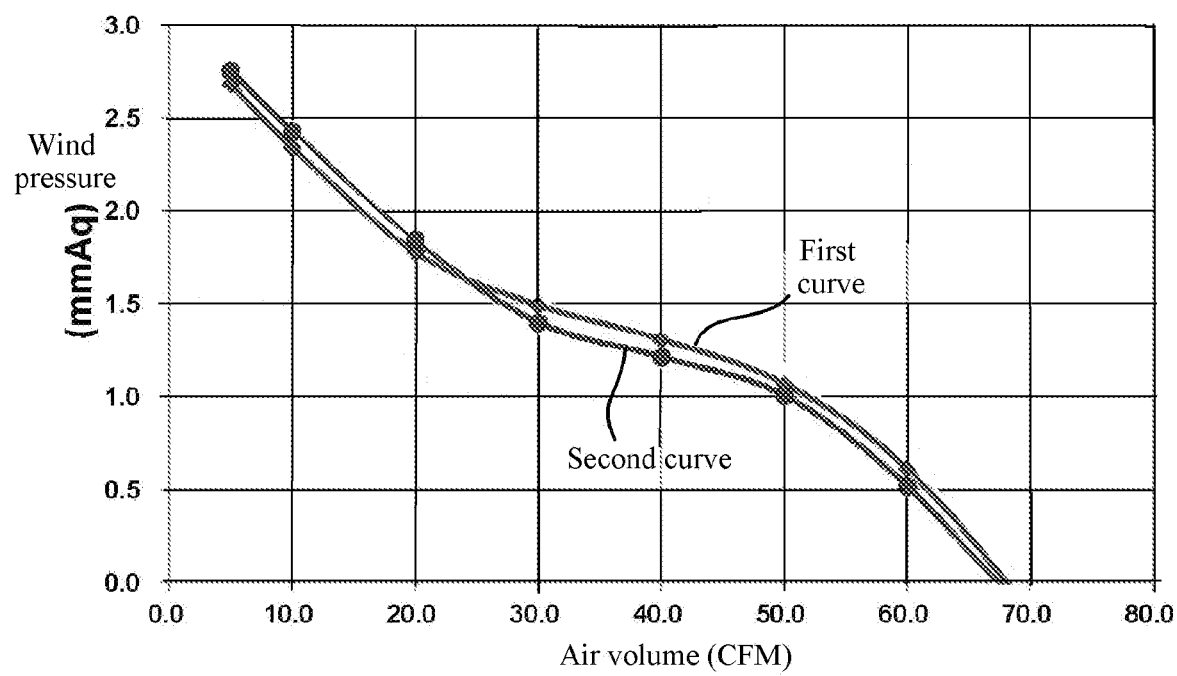
FIG. 5 is a schematic diagram of comparison between wind pressure and air volume of an air outlet of a heat dissipation fan according to the present invention and those in the prior art.

FIG. 5 is a schematic diagram of comparison between wind pressure and air volume of an air outlet of a heat dissipation fan according to the present invention and those in the prior art. As shown in FIG. 5, a first curve is a wind pressure and air volume curve of a heat dissipation fan having a double-layer blade structure in this embodiment. A second curve is a wind pressure and air volume curve that is under a same condition and that is of a heat dissipation fan having a single-layer blade and of a same size as the heat dissipation fan in this embodiment. It can be learned from the drawing that, when air volume is within a working range of (30 CFM to 70 CFM), the heat dissipation fan having a double-layer blade structure has greater wind pressure.

The following describes a working process of the heat dissipation fan in this embodiment of the present invention:

In the working process of the heat dissipation fan, an airflow enters the rotating heat dissipation fan from an air inlet of the heat dissipation fan. After rotation of fan blades, a part of the airflow passes through a primary air intake area of two neighboring double-layer blades 220, and another part of the airflow first passes an air guiding groove on each double-layer blade 222, then flows out through a secondary air intake area formed by the double-layer blades 222, and finally flows out through an air outlet of the heat dissipation fan.

In this embodiment of the present invention, the structure of the fan blade of the heat dissipation fan is improved, and the secondary blade is designed on the primary blade, and the secondary air intake area and the air guiding groove are further formed. In this way, air pressure is increased when the double-layer blades rotate. In addition, the secondary air intake area and the air guiding groove increase airflow aggregation and reduce resistance on the air intake side, thereby increasing wind pressure and reducing noise, and finally improving the performance of the heat dissipation fan.

In the foregoing specific implementations, the objective, technical solutions, and benefits of the present invention are further described in detail. It should be understood that the foregoing descriptions are merely specific implementations of the present invention, but are not intended to limit the protection scope of the present invention. Any modification, equivalent replacement, or improvement made without departing from the spirit and principle of the present invention should fall within the protection scope of the present invention.

What is claimed is:

1. A heat dissipation fan, wherein the heat dissipation fan comprises a fan frame and a fan blade disposed in the fan frame, wherein
the fan blade comprises a hub and a plurality of double-layer blades evenly disposed around the hub, and a primary air intake area is formed between the double-layer blades, the double-layer blade comprises a primary blade and a secondary blade, wherein a width of the secondary blade is less than a width of the primary blade, wherein the secondary blade is fixed on the primary blade at a secondary-air-intake-area air outlet end on an air intake side surface of the primary blade, and wherein the secondary blade is in parallel with the primary blade, thereby forming a secondary air intake area between the primary blade and the secondary blade, the primary blade includes a first edge and a second edge each extending an entire length of the primary blade, and a third edge connecting the first and second edge, the second edge being said secondary-air-intake-area air outlet end, the secondary blade is fixed at the secondary-air-intake-area air outlet end on the air intake side surface of the primary blade by a plurality of connecting plates, the plurality of connecting plates being arranged completely above said air intake side surface of the primary blade, and extending directly from the second edge of the primary blade toward the first edge over at least a half of the width of the primary blade, a height of each of the plurality of connecting plates with respect to said air intake side surface of the primary blade being decreased from one end that directly connects between the second edge of the primary blade and the secondary blade to the other end thereof, and when the heat dissipation fan works, an airflow enters the primary air intake area and the secondary air intake area of the heat dissipation fan through an air inlet of the heat dissipation fan, and forms a first airflow in the primary air intake area and a second airflow in the secondary air intake area, and the first airflow and the second airflow flow out through an air outlet of the heat dissipation fan.

2. The heat dissipation fan according to claim 1, wherein the secondary air intake area is cone-shaped, and a near-end cross-section of the secondary air intake area close to the hub is smaller than a far-end cross-section of the secondary air intake area distant from the hub.

3. The heat dissipation fan according to claim 2, wherein the cone is formed by changing a distance between the primary blade and the secondary blade.

4. The heat dissipation fan according to claim 2, wherein the cone is formed by changing a relationship between relative positions of the primary blade and the secondary blade.

5. The heat dissipation fan according to claim 1, wherein each of the connecting plates comprises a streamline structure that extends from the secondary-air-intake-area air outlet end to a secondary-air-intake-area air inlet end of the primary blade.

6. The heat dissipation fan according to claim 1, wherein an air guiding groove is formed between neighboring connecting plates on a same primary blade.

7. The heat dissipation fan according to claim 1, wherein connecting plates that are on different primary blades and that are equidistant to an axis of the hub are distributed on a same circumferential surface that is coaxial with an outer circumference of the hub.

8. The heat dissipation fan according to claim 1, wherein the secondary blade connects to the primary blade only via the plurality of connecting plates, and does not directly connect to the primary blade.

* * * * *